United States Patent
Eda et al.

(10) Patent No.: US 10,831,714 B2
(45) Date of Patent: Nov. 10, 2020

(54) CONSISTENT HASHING CONFIGURATIONS SUPPORTING MULTI-SITE REPLICATION

(71) Applicant: International Business Machines Corporation, Armonk, NY (US)

(72) Inventors: Sasikanth Eda, Vijayawada (IN); Sanjay Vipin Gandhi, Beaverton, OR (US); Dean Hildebrand, Bellingham, WA (US); Trishali Satish Nayar, Pune (IN); Brian Nelson, Austin, TX (US); William W. Owen, Tucson, AZ (US); Sandeep Ramesh Patil, Pune (IN); Smita J. Raut, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/269,813

(22) Filed: Feb. 7, 2019

(65) Prior Publication Data
US 2019/0171621 A1 Jun. 6, 2019

Related U.S. Application Data

(62) Division of application No. 15/285,398, filed on Oct. 4, 2016, now Pat. No. 10,248,659.

(51) Int. Cl.
*G06F 16/176* (2019.01)
*G06F 16/13* (2019.01)
(Continued)

(52) U.S. Cl.
CPC ............ *G06F 16/176* (2019.01); *G06F 3/061* (2013.01); *G06F 3/065* (2013.01); *G06F 3/067* (2013.01);
(Continued)

(58) Field of Classification Search
CPC ...... G06F 3/0608; G06F 3/061; G06F 3/0622; G06F 3/065; G06F 3/067;
(Continued)

(56) References Cited

U.S. PATENT DOCUMENTS 8,370,452 B2 2/2013 Harvell et al.
9,251,114 B1 2/2016 Ancin et al.
(Continued)

FOREIGN PATENT DOCUMENTS

CN 102934101 A 2/2013
CN 103646077 A 3/2014
CN 104412249 A 3/2015

OTHER PUBLICATIONS

Final Office Action from U.S. Appl. No. 16/269,796, dated Jan. 9, 2020.
(Continued)

*Primary Examiner* — Aracelis Ruiz
(74) *Attorney, Agent, or Firm* — Zilka-Kotab, P.C.

(57) ABSTRACT

A computer-implemented method, according to one embodiment, includes: sending management data to a designated common cell in a namespace of a central storage location from one or more remote storage locations. The management data corresponds to object data stored at the one or more remote storage locations. the object data stored at each of the one or more remote storage locations is further transferred to a respective cell in the namespace of the central storage location. Moreover, a modified consistency hashing algorithm configuration is implemented. The modified consistency hashing algorithm configuration routes updates of existing object data in the one or more remote storage locations to the respective cells in the central storage location. Other systems, methods, and computer program products are described in additional embodiments.

17 Claims, 7 Drawing Sheets

(51) Int. Cl.

| | | |
|---|---|---|
| *G06F 16/16* | (2019.01) | |
| *G06F 16/182* | (2019.01) | |
| *G06F 3/06* | (2006.01) | |
| *H04L 29/08* | (2006.01) | |
| *H04L 29/06* | (2006.01) | |
| *H04W 12/06* | (2009.01) | |

(52) U.S. Cl.
CPC .......... *G06F 3/0608* (2013.01); *G06F 3/0622* (2013.01); *G06F 3/0659* (2013.01); *G06F 16/137* (2019.01); *G06F 16/164* (2019.01); *G06F 16/182* (2019.01); *H04L 63/08* (2013.01); *H04L 63/0853* (2013.01); *H04L 67/1023* (2013.01); *H04L 67/1097* (2013.01); *H04W 12/06* (2013.01)

(58) Field of Classification Search
CPC ........... G06F 17/30097; G06F 17/3012; G06F 17/30165; G06F 17/30194; H04L 63/08; H04L 63/0853; H04L 67/1023; H04L 67/1097; H04W 12/06
See application file for complete search history.

(56) References Cited

U.S. PATENT DOCUMENTS

| | | | |
|---|---|---|---|
| 9,536,103 | B2 | 1/2017 | Redberg |
| 10,248,659 | B2 | 4/2019 | Eda et al. |
| 10,725,971 | B2 | 7/2020 | Eda et al. |
| 2010/0114889 | A1 | 5/2010 | Rabii et al. |
| 2011/0231524 | A1* | 9/2011 | Lin ...................... G06F 3/0635 709/220 |
| 2011/0246518 | A1 | 10/2011 | Mehrotra et al. |
| 2014/0067988 | A1 | 3/2014 | Noronha et al. |
| 2014/0324776 | A1 | 10/2014 | Novak et al. |
| 2015/0199375 | A1 | 7/2015 | Prahlad et al. |
| 2017/0030040 | A1 | 2/2017 | Zuzi et al. |
| 2017/0060865 | A1* | 3/2017 | Hildebrand ......... G06F 16/2255 |
| 2017/0123931 | A1 | 5/2017 | Aizman et al. |
| 2018/0095988 | A1 | 4/2018 | Eda et al. |
| 2019/0188186 | A1 | 6/2019 | Eda et al. |
| 2019/0238505 | A1* | 8/2019 | Richards ................ H04L 61/10 |

OTHER PUBLICATIONS

Eda et al., U.S. Appl. No. 16/269,796, filed Feb. 7, 2019.
List of IBM Patents or Patent Applications Treated as Related.
Non-Final Office Action from U.S. Appl. No. 16/269,796, dated Sep. 5, 2019.
IBM Knowledge Center, "Cache and Home," Aug. 23, 2016, pp. 1, Retrieved From http://www.ibm.com/support/knowledgecenter/STXKQY_4.2.1/com.ibm.spectrum.scale.v4r21 .doc/bl1ins_cacheandhomeAFM.htm.
ScottGPFS, IBM Developer Works, "Active File Management (AFM)," Sep. 30, 2015, pp. 1-3, Retrieved From https://www.ibm.com/developerworks/community/wikis/home?lang=en#!/wiki/General%20Parallel%20File%20System%20%28GPFS%29/page/Active%20File%20Management%20%28AFM%29.
Mirantis Inc., Open Stack, "Under the hood of Swift: the Ring," Feb. 15, 2012, pp. 1-7, Retrieved From http://www.openstack.org/blog/2012/02/1997/.
Open Stack, "The Rings," Apr. 17, 2016, pp. 1-6, Retrieved From http://docs.openstack.org/developer/swift/overview_ring.html.
VMware, "How Multi-site (WAN) Systems Work," vFabric 5 Documentation Center, Sep. 1, 2016, pp. 1-6, Retrieved From https://pubs.vmware.com/vfabric5/index.jsp?topic=/com.vmware.vfabric.gemfire.6.6/topologies_and_comm/topology_concepts/how_multisite_systems_work.html.
Eda et al., U.S. Appl. No. 15/285,398, filed Oct. 4, 2016.
International Search Report and Written Opinion from International Application No. PCT/IB2017/055753, dated Jan. 15, 2018.
Restriction Requirement from U.S. Appl. No. 15/285,398, dated Mar. 28, 2018.
Non-Final Office Action from U.S. Appl. No. 15/285,398, dated Jul. 12, 2018.
Notice of Allowance from U.S. Appl. No. 15/285,398, dated Nov. 19, 2018.
Notice of Allowance from U.S. Appl. No. 16/269,796, dated Mar. 20, 2020.

* cited by examiner

CONSISTENT HASHING CONFIGURATIONS SUPPORTING MULTI-SITE REPLICATION

BACKGROUND

The present invention relates to data storage networks, and more specifically, this invention relates to data storage network configurations that support improved multi-site data replication.

Traditional computer file systems store information in a database using a tree structure. These traditional systems have been successful for small collections of data like those on a local hard drive, but were not designed, and therefore not able, to handle larger amounts of data. Thus, as businesses continue to collect, store, access, transfer, etc. larger and larger volumes of unstructured content, traditional computer file systems are unable to meet business' needs.

A storage area network (SAN) is a network which provides access to consolidated, block level data storage. SANs are primarily used to enhance storage devices such as disk arrays, and tape libraries by making them accessible to servers so that the devices appear to the operating system as locally attached devices. SANs may be implemented over a wide area network (WAN) that covers a broad geographical area. Accordingly, access between storage devices may be facilitated regardless of their proximity to each other.

Object storage provides an advanced technique of storing information, where information is stored as objects. Each object contains the data itself (e.g., the bits and bytes), in addition to metadata that may include user and/or system defined tags. The metadata may describe the content of the data; how the corresponding object is related to other objects; how the data should be handled, replicated, or backed up; etc.

Advancements to object storage have been developed to increase the value of object storage and increase the speed at which the data in the objects can be accessed. These advancements implement an embedded compute engine within the storage object, which is typically called a "storlet". Thus, a storlet is a data storage object with a computational component stored inside, thereby enabling the object storage to perform computations to the data, as opposed to the system having to move the data to a compute node or server to perform the computation. The storlet can be provisioned or deployed on a compute node for execution b the compute node. When the storlet is executed, the efficiency of executing the storlet on the compute node depends on the type of operation the storlet performs and the capabilities and role of the compute node.

However, existing data storage networks have still been unable to efficiently store data therein while also ensuring that the data is available at the various storage locations within the network. As a result, existing data storage networks are forced to sacrifice either storage space, or availability/security of the data stored therein. Accordingly, a data storage network that allows for efficient use of storage space while also maintaining swift access to the data at any of the storage locations in the storage network is needed.

SUMMARY

A computer-implemented method, according to one embodiment, includes: sending management data to a designated common cell in a namespace of a central storage location from one or more remote storage locations. The management data corresponds to object data stored at the one or more remote storage locations. the object data stored at each of the one or more remote storage locations is further transferred to a respective cell in the namespace of the central storage location. Moreover, a modified consistency hashing algorithm configuration is implemented. The modified consistency hashing algorithm configuration routes updates of existing object data in the one or more remote storage locations to the respective cells in the central storage location.

A computer program product, according to another embodiment, includes a computer readable storage medium having program instructions embodied therewith. The program instructions executable by a processor to cause the processor to: perform the foregoing method.

A system, according to yet another embodiment, includes: a processor, and logic which is integrated with the processor, executable by the processor, or integrated with and executable by the processor. The logic is further configured to: perform the foregoing method.

Other aspects and embodiments of the present invention will become apparent from the following detailed description, which, when taken in conjunction with the drawings, illustrate by way of example the principles of the invention.

DETAILED DESCRIPTION

Figure 1:
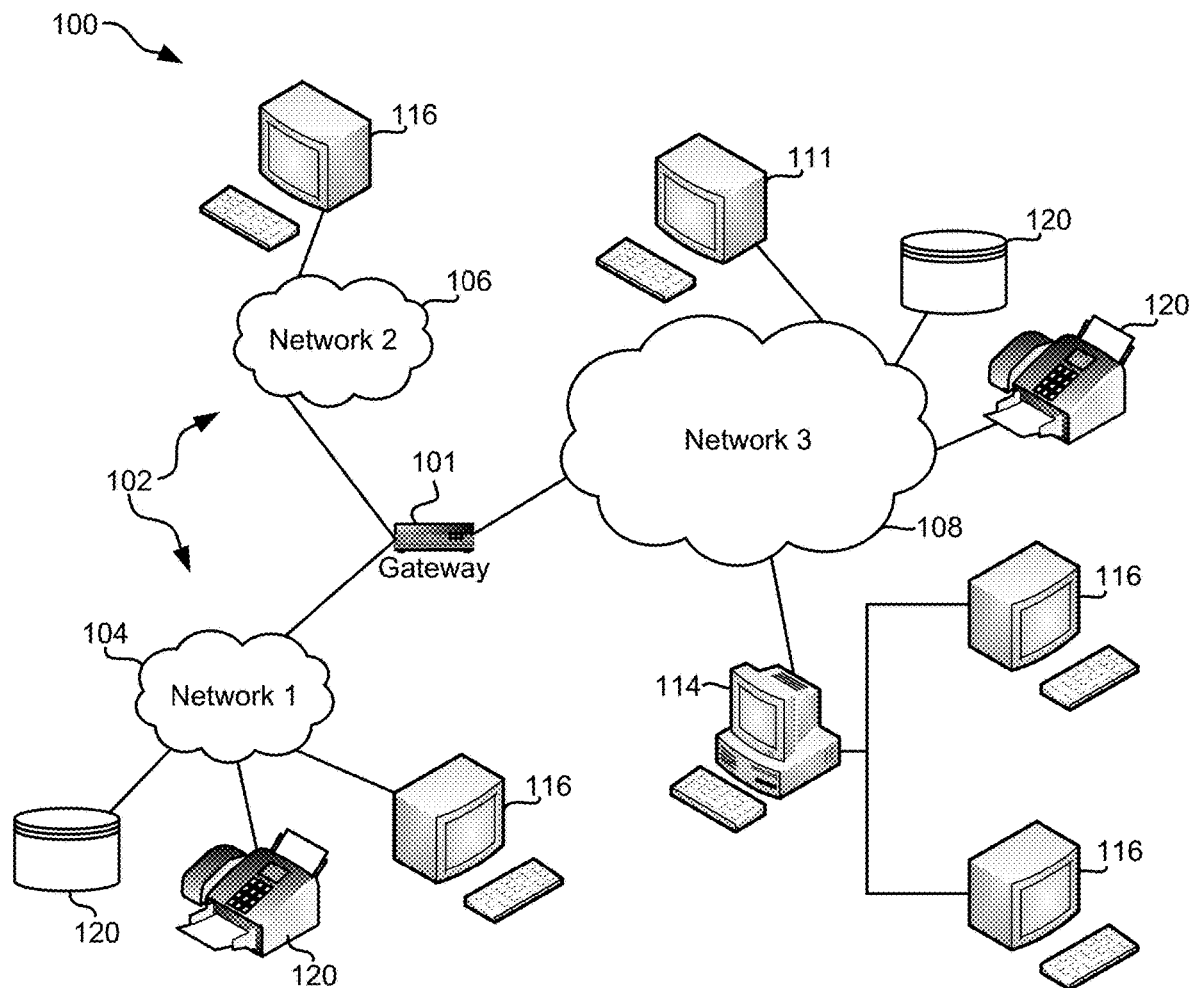
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for providing consistent multi-site data replication with improved storage efficiency. Moreover, different embodiments may add support for concurrent multi-site data access, uniform management data across the sites, and/or reduced object data corruption, as will be described in further detail below.

In one general embodiment, a computer-implemented method includes: creating a namespace in a central storage location, and dividing the namespace into more than one cell. A first cell is a common cell configured to store management data received from remote storage locations coupled to the central storage location. Each of the remaining cells are configured to store object data received from a respective one of the remote storage locations. The computer-implemented method further includes: receiving management data from the remote storage locations, storing the received management data in the common cell of the central storage location, receiving object data corresponding to the management data received from the remote storage locations, and storing the received object data in the respective cells of the central storage location. The management data corresponds to object data stored in the remote storage locations.

In another general embodiment, a computer program product includes a computer readable storage medium having program instructions embodied therewith, the program instructions executable by a processor to cause the processor to: create, by the processor, a namespace in a central storage location, and divide, by the processor, the namespace into more than one cell. A first cell is a common cell configured to store management data received from remote storage locations coupled to the central storage location. Each of the remaining cells are configured to store object data received from a respective one of the remote storage locations. The program instructions further executable by a processor to cause the processor to: receive, by the processor, management data from the remote storage locations, store, by the processor, the received management data in the common cell of the central storage location, receive, by the processor, object data corresponding to the management data received from the remote storage locations, and store, by the processor, the received object data in the respective cells of the central storage location. The management data corresponds to object data stored in the remote storage locations.

In another general embodiment, a system includes: a processor, and logic integrated with the processor, executable by the processor, or integrated with and executable by the processor, the logic being configured to: create, by the processor, a namespace in a central storage location, and divide, by the processor, the namespace into more than one cell. A first cell is a common cell configured to store management data received from remote storage locations coupled to the central storage location. Each of the remaining cells are configured to store object data received from a respective one of the remote storage locations. The logic is further configured to: receive, by the processor, management data from the remote storage locations, store, by the processor, the received management data in the common cell of the central storage location, receive, by the processor, object data corresponding to the management data received from the remote storage locations, and store, by the processor, the received object data in the respective cells of the central storage location. The management data corresponds to object data stored in the remote storage locations.

In yet another general embodiment, a computer-implemented method includes: sending management data to a designated common cell in a namespace of a central storage location from one or more remote storage locations, transferring the object data stored at each of the one or more remote storage locations to a respective cell in the namespace of the central storage location, and implementing a modified consistency hashing algorithm configuration. The management data corresponds to object data stored at the one or more remote storage locations. Moreover, the modified consistency hashing algorithm configuration routes updates of existing object data in the one or more remote storage locations to the respective cells in the central storage location.

In another general embodiment, a computer program product includes a computer readable storage medium having program instructions embodied therewith, the program instructions executable by a processor to cause the processor to: send, by the processor, management data to a designated common cell in a namespace of a central storage location from one or more remote storage locations, transfer, by the processor, the object data stored at each of the one or more remote storage locations to a respective cell in the namespace of the central storage location; and implement, by the processor, a modified consistency hashing algorithm configuration. The management data corresponds to object data stored at the one or more remote storage locations. Moreover, the modified consistency hashing algorithm configuration routes updates of existing object data in the one or more remote storage locations to the respective cells in the central storage location.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
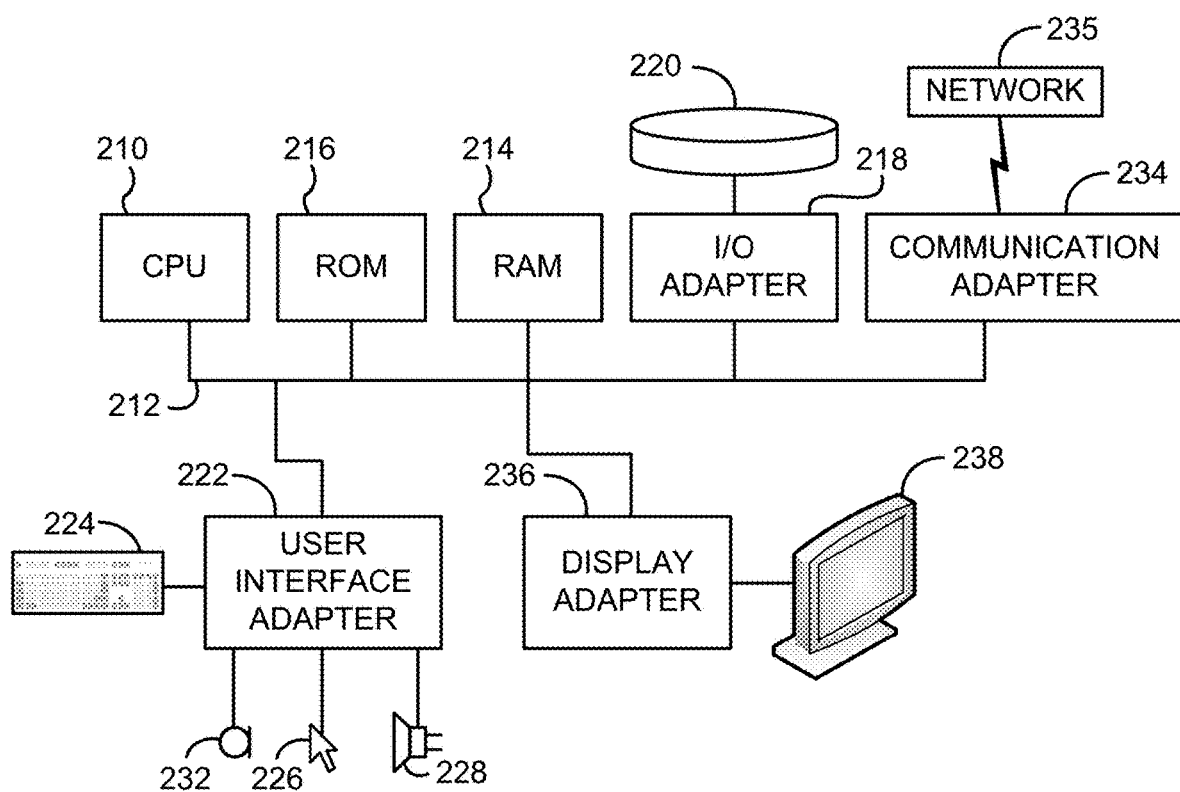
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
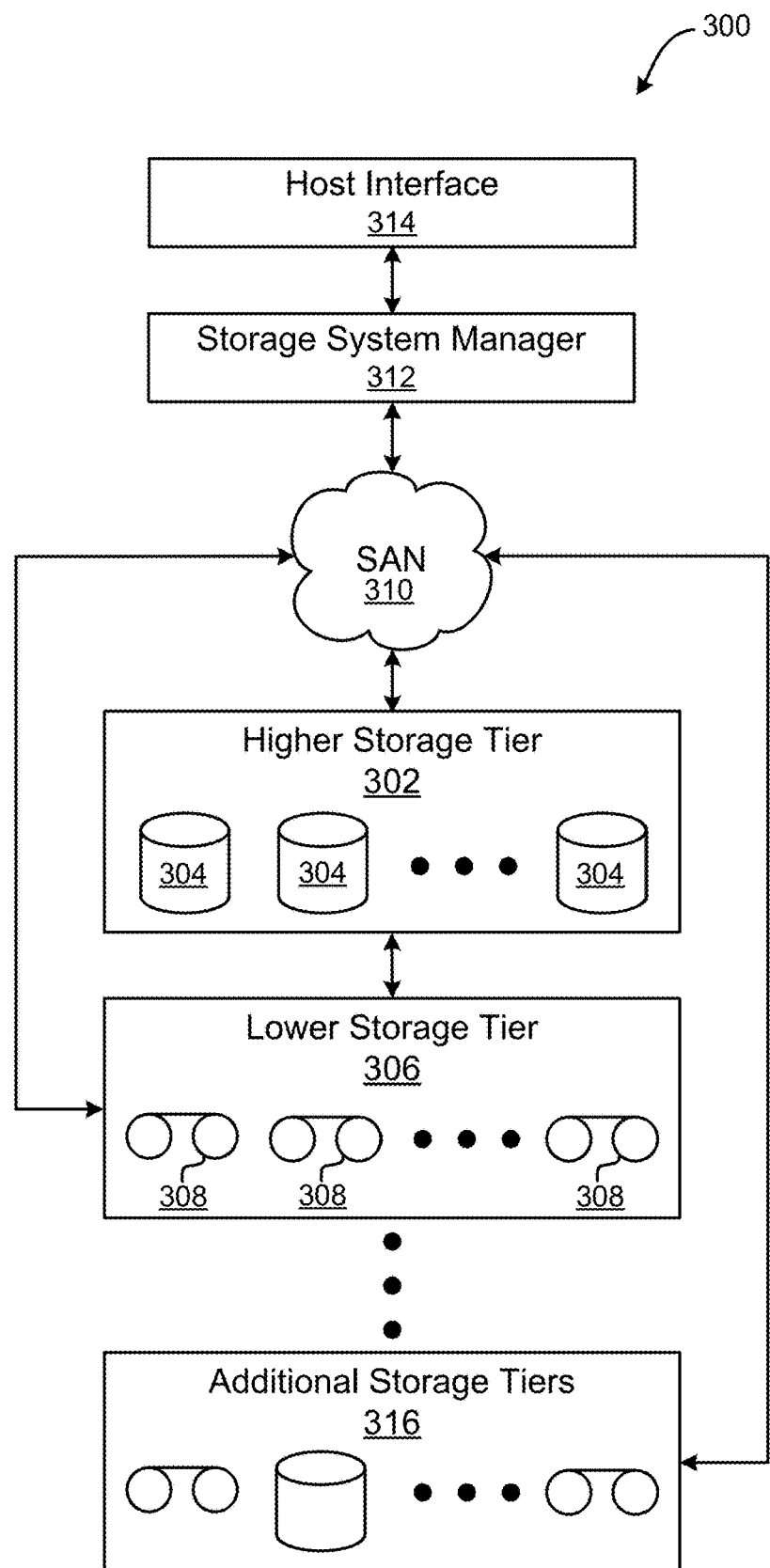
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

As previously mentioned, conventional data storage networks have experienced shortcomings in terms of providing data at different locations across the network efficiently.

For example, some conventional storage networks store multiple copies of the same data at different locations across the network, thereby increasing the availability of the data. However, in a multi-site network deployment, this causes the data to be replicated multiple time across various geographies, thereby adding a considerable amount of delay and increasing storage requirements for the network as a whole. Moreover, each network user has access to each copy of the data owned by (associated to) them, regardless of whether multiple copies of the data are residing in different geographic locations. As a result, geographical separation of access control is not possible in such conventional networks.

Other conventional storage networks unidirectionally move data to a central location. From there the data may ideally be accessed by any of the other locations in the network. However, this approach causes inconsistencies between the different database listings of a given portion of data. For instance, when metadata associated with a portion of data is updated according to a change made at a given location in the database, that change is not replicated to the other database locations immediately due to network delays and/or due to the fact that the network may already be consumed by other updates, thereby forming an inconsistency in the database listings at the different locations. Furthermore, such conventional storage networks result in increased data corruptions as well as data loss altogether as only a single copy of the data may exist.

In sharp contrast, various embodiments described herein may be able to provide consistent multi-site data replication with improved storage efficiency. Moreover, different embodiments may add support for concurrent multi-site data access, uniform management data across the sites, and/or reduced object data corruption, as will be described in further detail below.

Figure 4:
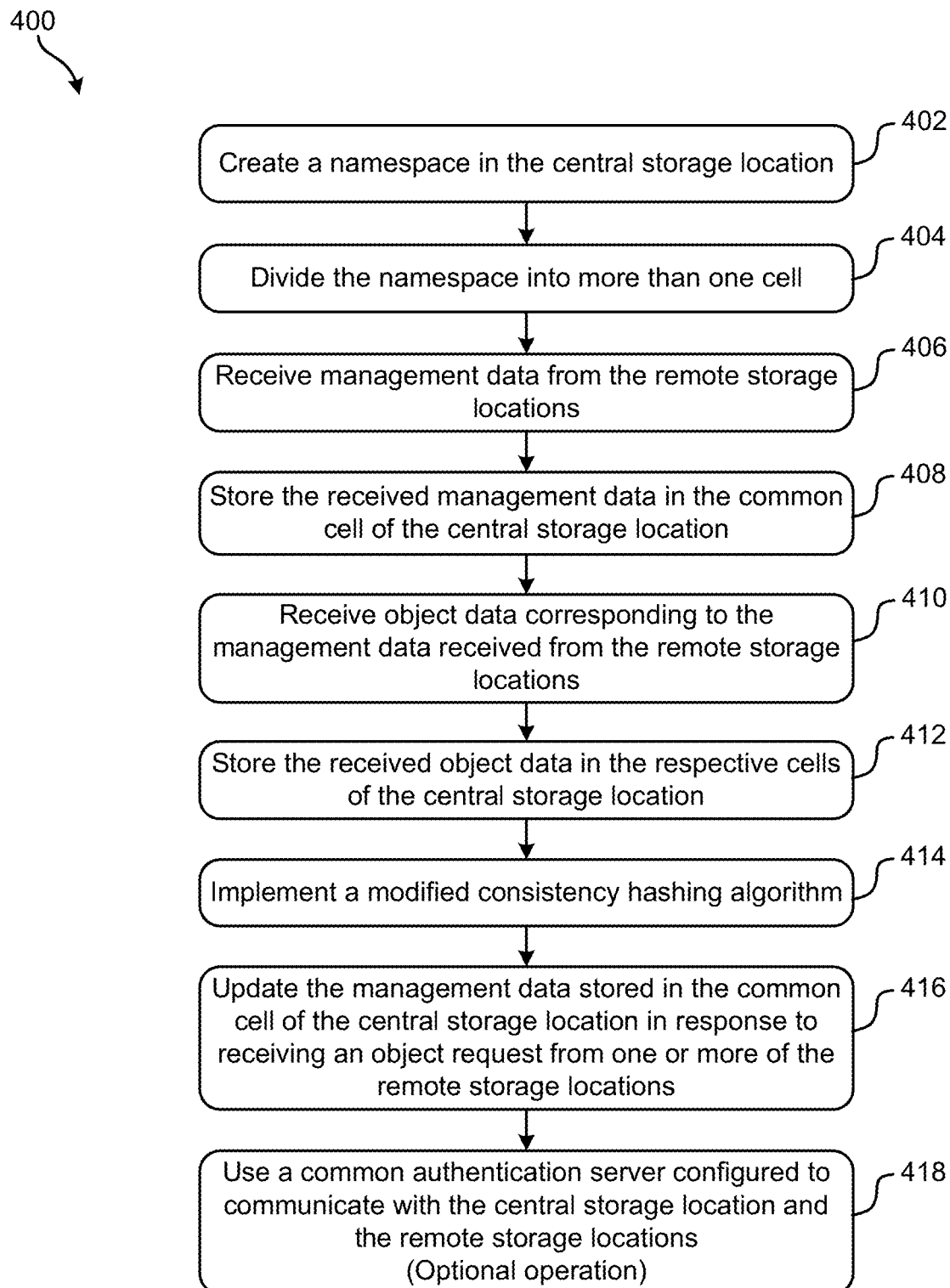
FIG. 4 is a flowchart of a method in accordance with one embodiment.

Now referring to FIG. 4, a flowchart of a computer-implemented method 400 is shown according to one embodiment. It should be noted that the operations of method 400 described below are preferably performed in a storage network having a central storage location and multiple remote storage locations coupled thereto, e.g., as illustrated in FIG. 5.

Figure 5:
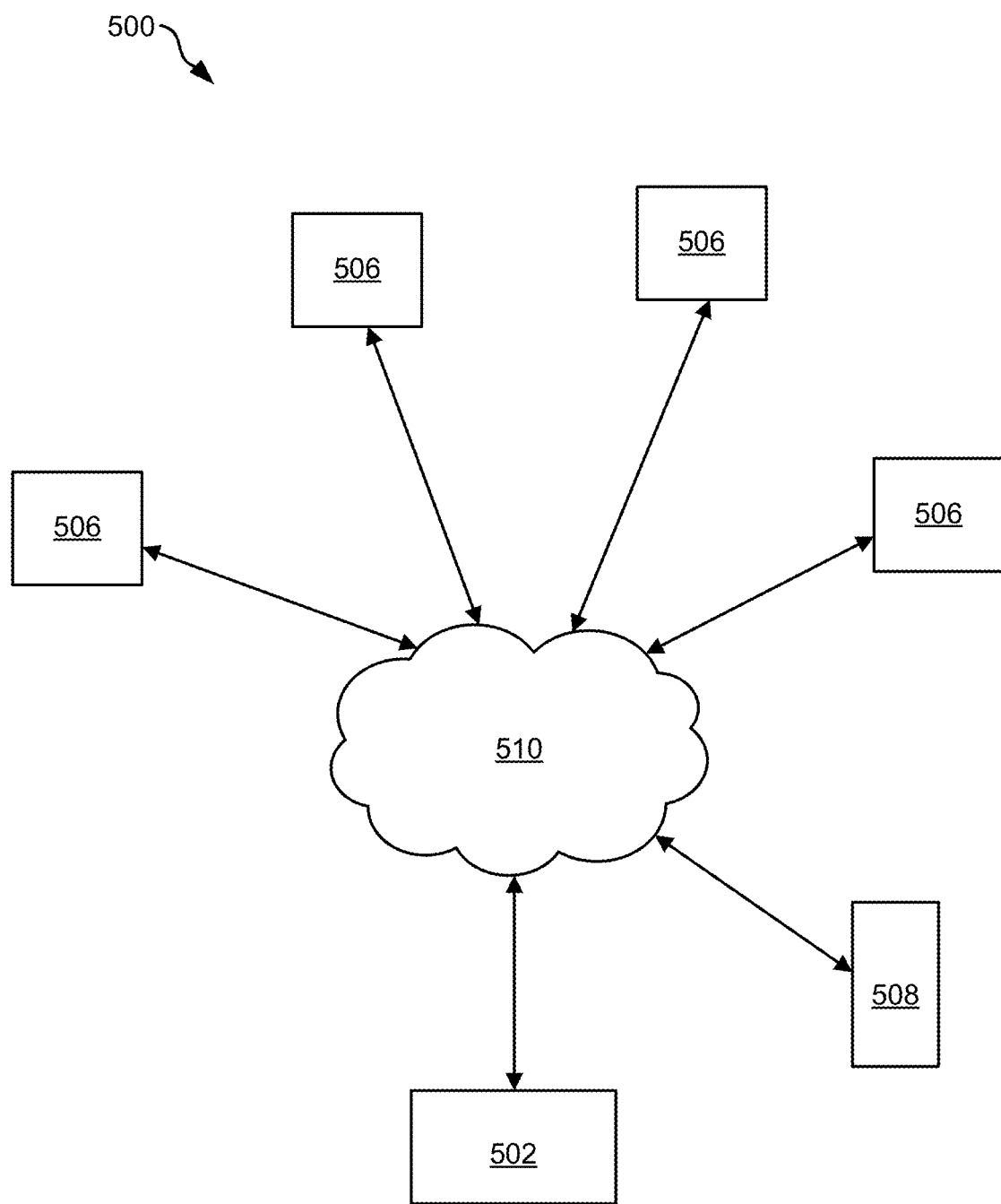
FIG. 5 is a storage network in accordance with one embodiment.

Referring momentarily to FIG. 5, a central storage location 502 of storage network 500 is illustrated as being connected (e.g., electrically coupled) to multiple remote storage locations 506 over a WAN 510 in accordance with one embodiment. It should be noted that although a WAN 510 is included in the present embodiment to connect the central storage location to the remoted storage locations and the authentication server 508, this is in no way intended to limit the invention. In some embodiments, a LAN may be used, e.g., if the central storage location and the remote storage locations are sufficiently close geographically.

However, method 400 of FIG. 4 may be performed in accordance with the present invention in any of the environments depicted in FIGS. 1-3, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, operation 402 includes creating a namespace in the central storage location. A namespace may be created in the central storage location in any way which would be apparent to one skilled in the art upon reading the present description.

In some embodiments the central storage location may implement node groups, e.g., according to an object storage architecture. According to one approach, a node group may be configured to perform distributed load handling and/or respond to requests of handling nodes into the namespace of the central storage location. In another approach, a node group may be used to perform write operations to memory (e.g., magnetic disks) and/or storage subsystems, thereby serving as a storage unit (repository) in some instances.

Moreover, operation 404 includes dividing the namespace into more than one cell, e.g., at least two cells. The number of cells which the namespace is divided into preferably corresponds to a number of remote storage locations which are coupled to the central storage location, e.g., over a data storage network. Moreover, the number and/or size of the cells which the namespace is divided into may be increased as more remote storage locations are coupled to the central storage location (e.g., are added to the data storage network), and decreased as remote storage locations are decoupled from the central storage location (e.g., are removed from the data storage network).

It is preferred that one of the cells (e.g., a first cell) created in operation 404 is a common cell configured to store management data received from remote storage locations coupled to the central storage location. In other words, one of the cells in the namespace is preferably designated as storing the management data received from all remote storage locations coupled to the central storage location in which the common cell is located. According to various approaches, "management data" may include account related data, e.g., user names, last logins, a number of containers, ACLs, total bytes consumed etc.; container related data, e.g., number of objects, object creation time, size, Etag; etc. In one approach, the remote storage locations may be mapped to their respective cell in the central storage location using new remote object node group tuning as would be apparent to one skilled in the art upon reading the present description.

Although it is preferred that only one of the cells is designated to store the management data, in some approaches more than one cell may be used. For example, more than one cell may be used to store management data in response to a significantly large number of remote storage locations being coupled to the central storage location, the central storage location receiving a large amount of management data, etc. However, in other approaches, the size of the common cell may simply be adjusted to accommodate any changes in the amount of management data stored at the central storage location.

Moreover, each of the remaining cells may be configured to store object data, and/or metadata corresponding to the object data, received from a respective one of the remote storage locations. In other words, each of the remaining cells may be designated to store the object data and/or corresponding metadata of a respective remote storage location. Referring momentarily again to network 500 of FIG. 5, a common cell may be used to store the management data received from all four of the remote storage locations. Along with the common cell, the namespace at the central storage location is preferably divided into an additional four cells. Each of the four cells are designated to store object data and/or metadata corresponding to the object data received from a respective one of the remote storage locations.

Referring again to FIG. 4, method 400 further includes receiving management data from the remote storage locations. See operation 406. Moreover, operation 408 includes storing the received management data in the common cell of the central storage location. As previously mentioned, the management data may correspond to object data stored in any (or all) of the remote storage locations. Thus, management data may update over time as object data is added to, removed from, updated in, etc., the various remote storage locations. Moreover, as remote storage locations themselves are coupled to the central storage location or decoupled from the central storage location, the management data included in the common cell may be adjusted and updated.

The rate at which the management data is updated in the common cell may vary depending on the desired embodiment. In some approaches, management data in the common cell may be updated each time a change is made to the object data at any of the remote locations. In other approaches, the management data may be updated once every specified period (e.g., of time), which may be adjusted accordingly. In still other approaches, the management data may be updated upon a predetermined condition being met, e.g., user request, receiving a specified number of object data requests from the remote storage locations, etc. However, it should be noted that a copy of the management data corresponding to a given remote storage location may also be stored in the remote storage location itself.

According to one embodiment, which is in no way intended to limit the invention, whenever an object request (e.g., received from any of the storage locations) updates the respective management data, the changes to the management data may asynchronously be replicated across all storage locations, such that the management data is consistent across the storage network, thereby reducing data corruption, as will be described in further detail below.

With continued reference to FIG. 4, operation 410 includes receiving the object data which corresponds to the management data received from the remote storage locations. Moreover, operation 412 includes storing the received object data in the respective cells of the central storage location. As previously mentioned, each of the remote storage locations may correspond to a unique cell in the namespace of the central storage location. Thus, object data received from a certain remote storage location is preferably stored in the cell associated to that given remote storage location, and not at the remote storage location itself. Accordingly, storage replication between the remote storage locations and the central storage location is preferably not implemented. Rather, the database may only be updated with the listing of objects, while actual object data is transferred to the central storage location, e.g., using WAN caching. In some approaches, object data may automatically be uploaded from the remote storage locations to the central storage location, while management data corresponding to the uploaded object data may be stored at both the central and remote storage locations.

According to an exemplary embodiment, object data may be transferred from each of the remote storage locations to the respective cells in the central storage location using WAN caching, e.g., implemented in independent writer mode. Independent writer mode allows both reads and writes to be performed over the storage network while pushing changes to the central storage location and checking for data (file) updates. According to one approach, WAN caching may be implemented for each of the object data cells in the namespace of the central storage location.

In some approaches, data written into an independent-writer file-set at a remote storage location may be transferred (pushed) to the central storage location as quickly as possible. However, if the same (or substantially similar) data already exists in the cache file-set at the remote storage location, it may be compared to the version of that data stored at the central storage location when opened to ensure the most updated version of the data is used. Accordingly, if it is determined that the central storage location contains the latest (most updated) version of the data, it may be used to update the data at the remote storage location.

By transferring the object data from each of the remote storage locations to the cell in the namespace of the central storage location that corresponds to each of the respective remote storage locations, while also maintaining a copy of the management data in each of the respective remote storage locations, improved storage efficiency may be achieved. More specifically, this consolidation of object data into the central storage location reduces the amount of network storage used at each of the remote storage locations, in addition to providing on-demand data recall capability at the remote storage locations. Moreover, geographically separated access control may be preserved, e.g., by applying access restrictions to portions of the object data. According to one approach, access restrictions may be implemented based on geographic location. Thus, a user at the central storage location may be unable to access particular object data, even if it is also stored at the central storage location. Similarly, any of the remote storage locations may be selectively denied access certain object data, object data metadata, management data, etc. Such restrictions may be implemented by leveraging a modified consistency hashing algorithm ring, as will soon become apparent.

Referring again to FIG. 4, method 400 also includes implementing a modified consistency hashing algorithm. See operation 414. The modified consistency hashing algorithm is preferably configured to route updates of the object data stored at the central storage location to the appropriate cell in the namespace. Thus, an update received at the central storage location from a given remote storage location may be routed to the unique cell corresponding to that remote storage location, such that the object data stored therein may be supplemented, removed, replaced, etc., or otherwise amended according to the updated received. In one approach, a multi-region settings file may be updated to contain details regarding each of the remote storage location and the object cluster details associated therewith. Accordingly, implementing a modified consistency hashing algorithm may enable a data storage network to desirably achieve uniform management of data across the various storage locations in the storage network.

Moreover, the ability to replace the portions (e.g., individual rows) of the object data corresponding to updates made thereto, allows for a significant reduction in the amount of network and/or storage location bandwidth used to perform an update to the object data. This is particularly apparent when compared to conventional storage networks which rewrite all the object data to implement an update to a portion of it.

In some embodiments, the modified consistency hashing algorithm may include a placement algorithm ring as would be appreciated by one skilled in the art upon reading the present description. According to one approach, the ring may use a configurable number of bits from a path's hash value as a partition index that designates a corresponding device. Other features such as replication, migration, health checker, etc., may also use the storage path determined by the modified consistency hashing algorithm.

A modified consistency hashing algorithm ring may be configured such that it is able to route the input/output (I/O) from each remote storage location to the respective cell in the central storage location. Moreover, a modified consistency hashing algorithm ring may be replicated across all remote storage locations as well as the central storage location, which may enable object data access to data from multiple sites as described herein. Depending on the approach, I/O may be initiated at the individual remote storage locations, or the namespace cells corresponding thereto.

As alluded to above, a modified consistency hashing algorithm ring may determine where data should reside in a cluster (storage location). According to some approaches, there may be a separate ring designated for account databases, container databases, individual object storage policies, etc., but each ring may work in the same or similar way. These modified consistency hashing algorithm rings may be externally managed, in that the server processes themselves do not modify the rings, they are instead given new rings modified by other tools.

In one embodiment, a modified consistency hashing algorithm ring uses a configurable number of bits from a path's MD5 hash as a partition index that designates a device. The number of bits kept from the hash may represent a partition power, and 2 raised to the value of the partition power may be used to indicate the partition count. Moreover, a replica count may be used to indicate how many partition to device assignments are included in a given ring. For a given partition number, each replica may be assigned to a different device in the ring as would be appreciated by one skilled in the art upon reading the present description.

Devices may be added to the ring to describe the capacity available for part to replica assignment. In some approaches, devices may be placed into failure domains that include region, zone, server, etc. Regions can be used to describe geographical systems characterized by lower-bandwidth, or higher latency between machines in different regions. Many rings may consist of only a single region. Zones can be used to group devices based on physical locations, power separations, network separations, etc., or any other attribute that would lessen multiple replicas being unavailable at the same time.

Devices may also be given a weight which describes a relative weight of the device in comparison to other devices. When building a modified consistency hashing algorithm ring all of each part's replicas may be assigned to devices according to their weight. Additionally, in some approaches, each replica of a part will attempt to be assigned to a device with a failure domain that does not already have a replica for the part. In some approaches, only a single replica of a part may be assigned to each device. In other words, there must be an equal number of devices and replicas.

The modified consistency hashing algorithm rings may be built and/or managed manually by a utility called a "ring-builder". The ring-builder may assign partitions to devices and writes an optimized structure to serialized file which may be shipped out to the servers at remote storage location. The server processes may check the modification time of the file occasionally and reload their in-memory copies of the modified consistency hashing algorithm ring structure as desired.

The ring-builder may also keep a unique builder file with the ring information and additional data used to build future modified consistency hashing algorithm rings. It is preferred that the unique builder file is safeguarded from corruption and/or deletion. One option to ensure the unique builder file is safeguarded may involve copying the builder files out to every remote storage location, while copying the modified consistency hashing algorithm ring files themselves. Another is to upload the builder files into the cluster itself.

Object data stored at the central storage location may be requested at any of the remote storage locations. According to some approaches, object data may be requested at a remote storage location by sending a pre-fetch command to the central storage location. In other approaches, object data may be requested from the central storage location as a result of a file being opened at a remote storage location. In response to receiving an object data command, the central storage location may provide the requested object data to an independent-writer cache.

Object data requests received from one or more of the remote storage locations may affect the management data associated with the object data being requested. For example, a remote storage location may request access to object data stored in the cell at the central storage location that corresponds to that remote storage location. Once access to the requested object data is granted, the remote storage location may change management data corresponding to that object data by updating account related data (e.g., changing a file name, logging in, etc.) and/or by updating container related data (e.g., adjusting the logical groupings of objects). In some approaches, the remote storage location may amend the object data itself and/or metadata corresponding thereto. Accordingly, operation 416 includes updating the management data stored in the common cell of the central storage location in response to receiving an object request from one or more of the remote storage locations. By updating the management data, the common cell in the central storage location may be able to maintain an accurate representation of the object data in the storage network. Moreover, the data storage network may be able to achieve uniform management of data across the various storage locations in the storage network.

Referring again to FIG. 5 momentarily, a storage network 500 may include an authentication server 508. The authentication server 508 may be used to facilitate authentication of an entity that attempts to access the network 500, e.g., such as a user, another server, etc. According to an exemplary approach, the authentication server 508 may be an external keystone server that is accessible by all remote storage locations 506 as well as the central storage location 502. The authentication server 508 may reside in a dedicated computer, an Ethernet switch, an access point, a network access server, etc., depending on the desired embodiment.

Thus, referring back to method 400 of FIG. 4, optional operation 418 includes using a common authentication server configured to communicate with the central storage location and the remote storage locations. By implementing a common authentication server configured as such, a data storage network may desirably be able to achieve uniform management of data across the various storage locations in the storage network, and/or achieve reduced object data corruption. However, in some embodiments, more than one authentication server may be used.

It is also preferred that the central storage location and each of the remote storage locations of a storage network include an equal number of IP addresses. For example, there may be five IP addresses included at the central storage location and a corresponding five IP addresses included at each of the remote storage locations. However, in other approaches, the number of IP addresses included at each of the storage locations may differ. For example, the central storage location may include more IP addresses than each of the remote storage locations. The IP addresses at each of the storage locations may be used to facilitate communication therebetween as would be appreciated by one skilled in the art upon reading the present description. Accordingly, a data storage network may be able to achieve improved concurrent multi-site data access.

In some approaches the IP addresses may be cluster export services (CES) IP addresses. Moreover, each of the consistency hashing rings may be modified to change the central storage location cluster export services (CES) IP addresses to individual remote storage location cluster CES IP addresses.

As would be appreciated by one skilled in the art upon reading the present description, CES may include support for monitoring high availability through protocols and/or commands. In some approaches, a subset of nodes in the cluster may be configured to provide a highly available solution for exporting file systems by using the Network File System (NFS), Server Message Block (SMB), object protocols, etc. This functionality may be achieved by using General Parallel File System (GPFS). The participating nodes may be designated as CES nodes (e.g., CES clusters) or protocol nodes.

A set of IP addresses may be considered a CES address pool. Thus, the set of IP addresses may be defined and distributed among the CES nodes. As nodes enter and leave the GPFS cluster, the addresses in the pool may be redistributed among the CES nodes to provide high availability. Moreover, remote clients may use these addresses to access the cluster.

According to some approaches, each CES node may run a separate GPFS utility that monitors the state of the node. This utility includes checks of the CES addresses that are assigned to the node and/or a check of the processes that implement the enabled services in the CES cluster. Upon failure detection, the monitoring utility might mark the node as temporarily unable to participate in the CES cluster and reassign any addresses that are assigned to the node.

In different approaches, CES may support any one or more of the following protocols: NFS, SMB, and Object. Moreover, each protocol may be enabled or disabled in the cluster. According to one approach, all CES nodes may run servers for a protocol in response to that protocol being enabled in the CES cluster.

The operations included in method 400 are tailored such that they may be performed by a controller coupled to a central storage location. Method 600 includes similar operations that may be performed by a controller coupled to any one or more of the remote storage locations, according to one embodiment. It should be noted that the operations of method 600 described below are preferably performed in a storage network having a central storage location and multiple remote storage locations coupled thereto, e.g., as illustrated in FIG. 5. However, method 600 of FIG. 6 may be performed in accordance with the present invention in any of the environments depicted in FIGS. 1-5, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

Figure 6:
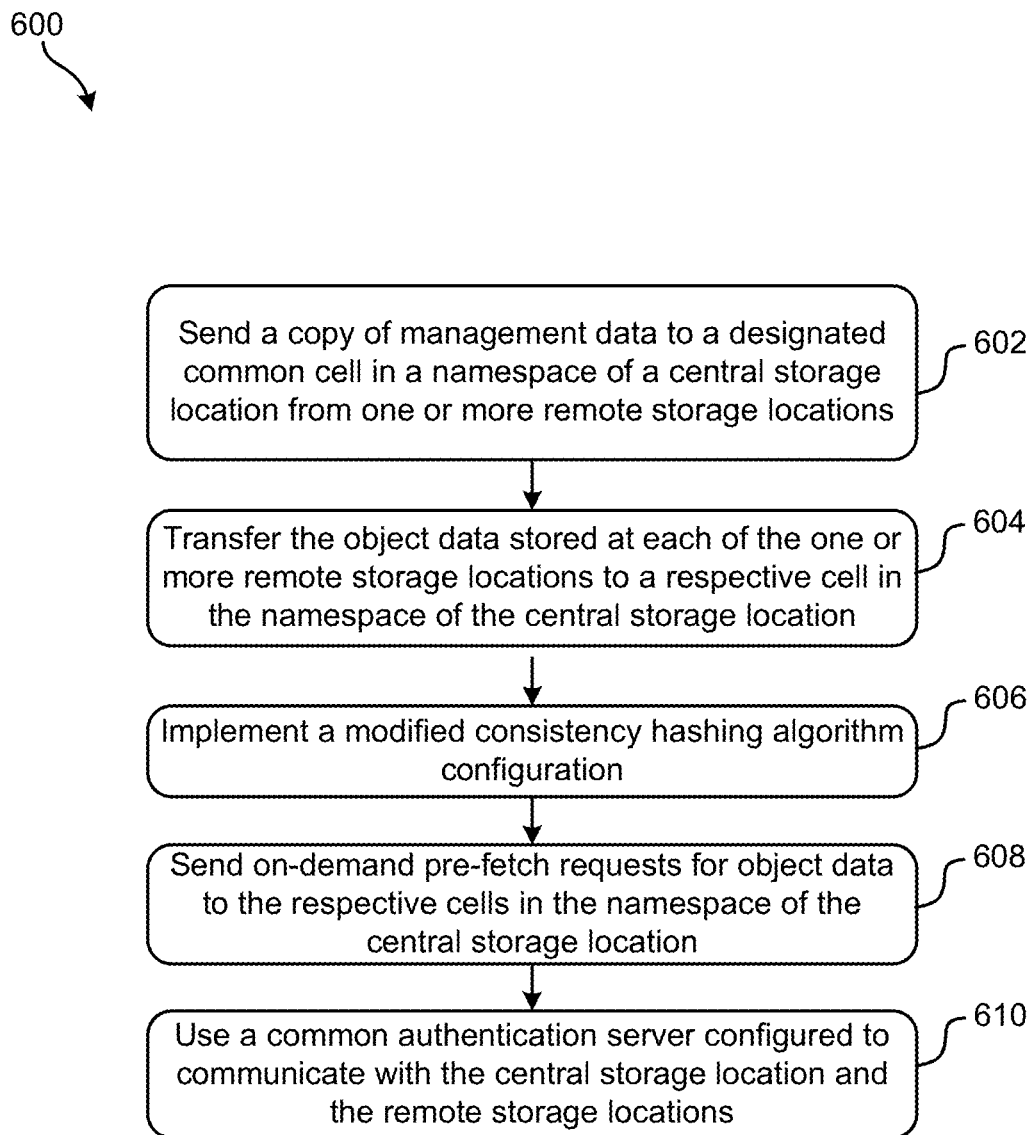
FIG. 6 is a flowchart of a method in accordance with one embodiment.

As shown in FIG. 6, operation 602 includes sending a copy of management data to a designated common cell in a namespace of a central storage location from one or more remote storage locations, while the original copy of the management data may be kept at the respective remote storage location. As mentioned above, a namespace at the central storage location is preferably divided into multiple cells. A first of the cells (the common cell) may be used to store the management data received from all of the remote storage locations connected to the central storage location. The other cells may each be individually assigned to a remote storage location, preferably such that each of the remote storage locations are assigned to a unique cell at the central storage location.

The management data sent in operation 602 may correspond to object data currently stored at the one or more remote storage locations. For example, a user may store new object data to a remote storage location by performing a write operation thereto. With the new object data, management data may also be formed at the remote storage location. Once a copy of the management data is sent to the central storage location, the object data and/or object data metadata from a given remote storage location is preferably stored in the cell at the central storage location that corresponds to that remote storage location. Accordingly, operation 604 includes transferring the object data stored at each of the one or more remote storage locations to a respective cell in the namespace of the central storage location.

In some embodiments, operation 604 may include implementing a WAN caching procedure. By implementing WAN caching, object data at various remote storage locations may be transferred to central storage location (e.g., data center), thereby reducing the amount of storage required at each of the remote storage locations. This is particularly true for embodiments that implement a WAN caching procedure implemented in independent writer mode, e.g., as described above. Moreover, WAN caching procedures may be able to facilitate a provision to recall and/or pre-fetch object data at the remote storage locations from the central storage location on demand, e.g., as introduced in the various embodiments described herein.

Remote storage location settings may be adjusted depending on the desired embodiment. According to one embodiment, which is in no way intended to limit the invention, each of the respective container server and/or account configuration files may be configured to store data on locally created storages. Moreover, each remote storage location node may be enabled as a WAN caching gateway node. As a result, each of the remote storage locations may be able to push object data to the central storage location.

Method 600 further includes implementing a modified consistency hashing algorithm configuration. See operation 606. As previously mentioned, the modified consistency hashing algorithm configuration may be used to route updates of existing object data in the one or more remote storage locations to the respective cells in the central storage location namespace. Moreover, the modified consistency hashing algorithm configuration may be configured to route requests to the management data sent from the remote storage locations to the common cell in the central storage location. Accordingly, implementing a modified consistency hashing algorithm may enable a data storage network to desirably achieve uniform management of data across the various storage locations in the storage network.

In some embodiments, the modified consistency hashing algorithm may include a placement algorithm ring as would be appreciated by one skilled in the art upon reading the present description. According to one approach, the ring may use a configurable number of bits from a path's hash value as a partition index that designates a corresponding device.

With continued reference to FIG. 6, operation 608 includes sending on-demand pre-fetch requests for object data to the respective cells in the namespace of the central storage location. Again, each of the remote storage locations preferably correspond to a unique cell in the namespace at the central storage location. Moreover, the object data from the remote storage locations is preferably stored in the respective cells. Thus, access to object data may be achieved by sending a request from a remote storage location as would be appreciated by one skilled in the art upon reading the present description. By doing so, the data storage network may be able to achieve improved concurrent multi-site data access.

As previously mentioned, it may be desirable that a single authentication server is used to communicate with the central storage location as well as the remote storage locations (e.g., see 508 of FIG. 5). Accordingly, operation 610 includes using a common authentication server configured to communicate with the central storage location and the remote storage locations. As previously mentioned, by implementing a common authentication server configured as such, a data storage network may desirably be able to achieve uniform management of data across the various storage locations in the storage network, and/or achieve reduced object data corruption.

Figure 7:
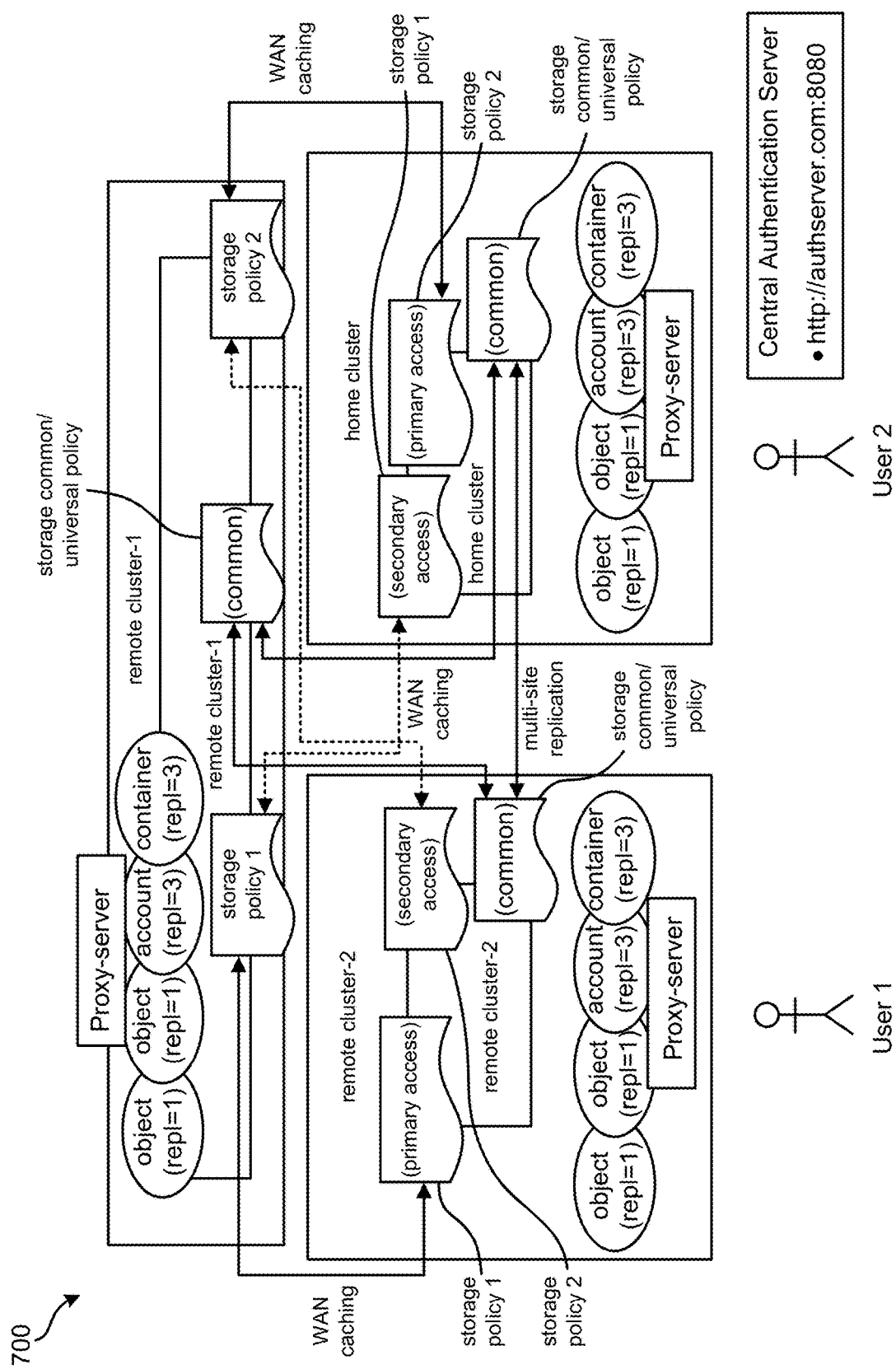
FIG. 7 is a diagram of a storage network in accordance with one embodiment.

FIG. 7 depicts a data storage network 700, in accordance with an in-use embodiment. As an option, the present data storage network 700 may be implemented in conjunction with features from any other embodiment listed herein, such as those described with reference to the other FIGS., such as FIGS. 4-6. However, such data storage network 700 and others presented herein may be used in various applications and/or in permutations which may or may not be specifically described in the illustrative embodiments listed herein. Further, the data storage network 700 presented herein may be used in any desired environment. Thus FIG. 7 (and the other FIGS.) may be deemed to include any possible permutation.

As shown, the data storage network 700 of FIG. 7 includes a storage network 700 according to an in-use embodiment as previously mentioned, may include an authentication server 508. The authentication server 508 may be used to facilitate authentication of an entity that attempts to access the network 500, e.g., such as a user, another server, etc. According to an exemplary approach, the authentication server 508 may be an external keystone server that is accessible by all remote storage locations 506 as well as the central storage location 502. The authentication server 508 may reside in a dedicated computer, an Ethernet switch, an access point, a network access server, etc., depending on the desired embodiment.

Data storage network 700 includes two remote storage locations (e.g., remote clusters) remote cluster-1 and remote cluster-2 which are associated with three storage policies storage policy 1, storage policy 2 and storage common/universal policy. A first of the storage policies (storage common/universal policy as represented in FIG. 7) may be used for replicating management data, while the other two storage policies storage policy 1, storage policy 2 are related to object data access.

Each of the storage policies storage policy 1, storage policy 2, storage common/universal policy is associated with a cell, and each of the respective cells may further be mapped with a unique cell created at the central storage location (e.g., home site) home cluster. Accordingly, object data from any of the storage policies may be transferred to, and preferably stored in the corresponding unique cell in the central storage location, e.g., according to any of the approaches described herein.

Management data generated at any of the storage locations is also preferably replicated three times (represented by replication factor "repl=3") using object multi-site replication. Accordingly, uniform listing of the management data may be achieved across all storage locations, e.g., as described and/or suggested herein.

For storage policy 1 and storage policy 2, the replication factor for object data is set to 1 (represented by replication factor "repl=1"), which indicates that object data generated at any of the storage locations will be sent (e.g., transferred or uploaded) to the central storage location home cluster for storage, while only stubs associated with the object data are stored at respective storage locations.

The "primary access" and "secondary access" are related to access control such that a user from one remote storage location will be able to access his/her object data from any other remote storage location as well. According to an example, which is in no way intended to limit the invention, the object data originated at a remote cluster remote cluster-1 will be replicated to the home cluster home cluster. This data will also be replicated to the other remote clusters remote cluster-2 and vice versa. According to the present example, "replicated" is intended to mean that the object data is moved (e.g., uploaded or transferred) to the home cluster home cluster, but stubs to the original object data is available at both remote clusters remote cluster-1 and remote cluster-2.

Referring still to FIG. 7, access restrictions may be applied for each storage policy. According to an example, storage policy-1 (primary access) denotes that even though a cell is replicated from a given remote storage location to the central storage location in addition to the other remote storage locations, only the users associated to the given remote storage location may be given access to it. In some approaches, users with access to particular data may be able to access that data from any storage location in the network. In other words, a user associated with remote cluster-2 may not be given access to data stored by users associated with a different remote storage location in the same storage network.

The various embodiments described herein may be able to achieve significant improvements over conventional data storage networks. Namely, by storing copies of management data (e.g., account related data, container related data, etc.) at the remote storage locations as well as a common cell at the central storage location, a unified data and management plane is achieved, which helps provide near-instant access to object data and supports uniform management data listing across multiple regions. This also is able to significantly reduce the probability of object data corruption and/or management data corruption for the database.

Furthermore, embodiments described herein may be able to achieve on demand object data pre-fetch capability from the central storage location to any one or more of the remote storage locations, while also reducing the amount of storage needed at each of the remote storage locations. As described above, this may be achieved by maintaining object data in cells at the central storage location. Moreover, by implementing WAN caching in some of the embodiments described herein is able to form an appropriate solution to solve conventional data path challenges.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
    sending management data to a designated common cell in a namespace of a central storage location from one or more remote storage locations, wherein the management data corresponds to object data stored at the one or more remote storage locations;
    transferring the object data stored at each of the one or more remote storage locations to a respective cell in the namespace of the central storage location; and
    implementing a modified consistency hashing algorithm configuration,
    wherein the modified consistency hashing algorithm configuration routes updates of existing object data in the one or more remote storage locations to the respective cells in the central storage location.

2. The computer-implemented method of claim 1, comprising:
    sending on-demand pre-fetch requests for object data to the respective cells in the namespace of the central storage location.

3. The computer-implemented method of claim 1, wherein the modified consistency hashing algorithm configuration routes requests to the management data sent from the remote storage locations to the common cell in the central storage location.

4. The computer-implemented method of claim 1, wherein each of the central storage location and the remote storage locations include an equal number of Internet Protocol addresses.

5. The computer-implemented method of claim 1, comprising:
    using a common authentication server configured to communicate with the central storage location and the remote storage locations.

6. The computer-implemented method of claim 1, wherein the central storage location and the remote storage locations are connected over a wide area network.

7. A computer program product comprising a computer readable storage medium having program instructions embodied therewith, the program instructions executable by a processor to cause the processor to:
    send, by the processor, management data to a designated common cell in a namespace of a central storage location from one or more remote storage locations, wherein the management data corresponds to object data stored at the one or more remote storage locations;
    transfer, by the processor, the object data stored at each of the one or more remote storage locations to a respective cell in the namespace of the central storage location; and
    implement, by the processor, a modified consistency hashing algorithm configuration,
    wherein the modified consistency hashing algorithm configuration routes updates of existing object data in the one or more remote storage locations to the respective cells in the central storage location.

8. The computer program product of claim 7, wherein the program instructions are executable by the processor to cause the processor to:
    send, by the processor, on-demand pre-fetch requests for object data to the respective cells in the namespace of the central storage location.

9. The computer program product of claim 7, wherein the modified consistency hashing algorithm configuration routes requests to the management data sent from the remote storage locations to the common cell in the central storage location.

10. The computer program product of claim 7, wherein each of the central storage location and the remote storage locations include an equal number of Internet Protocol addresses.

11. The computer program product of claim 7, wherein the program instructions are executable by the processor to cause the processor to:
    use, by the processor, a common authentication server configured to communicate with the central storage location and the remote storage locations.

12. The computer program product of claim 7, wherein the central storage location and the remote storage locations are connected over a wide area network.

13. A system, comprising:
    a processor; and
    logic integrated with the processor, executable by the processor, or integrated with and executable by the processor, the logic being configured to:
        send, by the processor, management data to a designated common cell in a namespace of a central storage location from one or more remote storage locations, wherein the management data corresponds to object data stored at the one or more remote storage locations;

transfer, by the processor, the object data stored at each of the one or more remote storage locations to a respective cell in the namespace of the central storage location;

implement, by the processor, a modified consistency hashing algorithm configuration; and send, by the processor, on-demand pre-fetch requests for object data to the respective cells in the namespace of the central storage location, wherein the modified consistency hashing algorithm configuration routes updates of existing object data in the one or more remote storage locations to the respective cells in the central storage location.

14. The system of claim 13, wherein the modified consistency hashing algorithm configuration routes requests to the management data sent from the remote storage locations to the common cell in the central storage location.

15. The system of claim 13, wherein each of the central storage location and the remote storage locations include an equal number of Internet Protocol addresses.

16. The system of claim 13, the logic being configured to:
use, by the processor, a common authentication server configured to communicate with the central storage location and the remote storage locations.

17. The system of claim 13, wherein the central storage location and the remote storage locations are connected over a wide area network.

* * * * *